US012602608B2

(12) United States Patent
Bae et al.

(10) Patent No.: US 12,602,608 B2
(45) Date of Patent: Apr. 14, 2026

(54) METHOD AND DEVICE FOR QUANTUM ERROR FILTERING USING QUANTUM ERROR FILTERING CODE

(71) Applicant: Korea Advanced Institute of Science and Technology, Daejeon (KR)

(72) Inventors: Joonwoo Bae, Daejeon (KR); Hyeokjea Kwon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 94 days.

(21) Appl. No.: 18/701,496

(22) PCT Filed: Jan. 12, 2024

(86) PCT No.: PCT/KR2024/000620
§ 371 (c)(1),
(2) Date: Apr. 15, 2024

(87) PCT Pub. No.: WO2025/028740
PCT Pub. Date: Feb. 6, 2025

(65) Prior Publication Data
US 2025/0232205 A1      Jul. 17, 2025

(30) Foreign Application Priority Data

Jul. 31, 2023      (KR) ......................... 10-2023-0099529

(51) Int. Cl.
G06N 10/70      (2022.01)
B82Y 10/00      (2011.01)
G06N 10/20      (2022.01)

(52) U.S. Cl.
CPC ............. *G06N 10/70* (2022.01); *G06N 10/20* (2022.01); *B82Y 10/00* (2013.01)

(58) Field of Classification Search
CPC ........ G06N 10/70; G06N 10/20; G06N 10/40; B82Y 10/00
See application file for complete search history.

(56) References Cited

U.S. PATENT DOCUMENTS

| 12,141,660 B2 * | 11/2024 | Jiang ...................... H04L 1/0041 |
| 2019/0244128 A1 * | 8/2019 | Choi ...................... G06N 10/20 |

FOREIGN PATENT DOCUMENTS

WO      WO-2024100423 A1 *   5/2024   ............. G06N 10/70

OTHER PUBLICATIONS

J. P. Marceaux and K. Young, "Streaming Quantum Gate Set Tomography Using the Extended Kalman Filter," 2023 IEEE International Conference on Quantum Computing and Engineering (QCE), Bellevue, WA, USA, 2023, pp. 1401-1411, (Year: 2023).*

(Continued)

*Primary Examiner* — Cynthia Britt
(74) *Attorney, Agent, or Firm* — NIXON PEABODY LLP

(57)      ABSTRACT

Provided is a method and device for quantum error filtering using a quantum error filtering code that may encode a quantum state for input data, may output, to a quantum circuit, a plurality of logical qubits each implemented as a plurality of physical qubits based on a predefined quantum error filtering code, and may detect a quantum error in one of the input logical qubits based on parities measured from the physical qubits for the logical qubits input through the quantum circuit.

17 Claims, 6 Drawing Sheets

(56)     References Cited

OTHER PUBLICATIONS

Roffe, "Quantum Error Correction: An Introductory Guide," Department of Physics & Astronomy, University of Sheffield, dated Jul. 26, 2019, (29 pages).

Devitt et al. "Quantum error correction for beginners," Reports on Progress in Physics, IOP Publishing, published Jun. 20, 2013, doi: 10.1088/0034-488/76/7/076001 (35 pages).

Extended European Search Report in EP Application No. EP24714757, dated Jul. 21, 2025, (11 pages).

* cited by examiner

FIG. 6

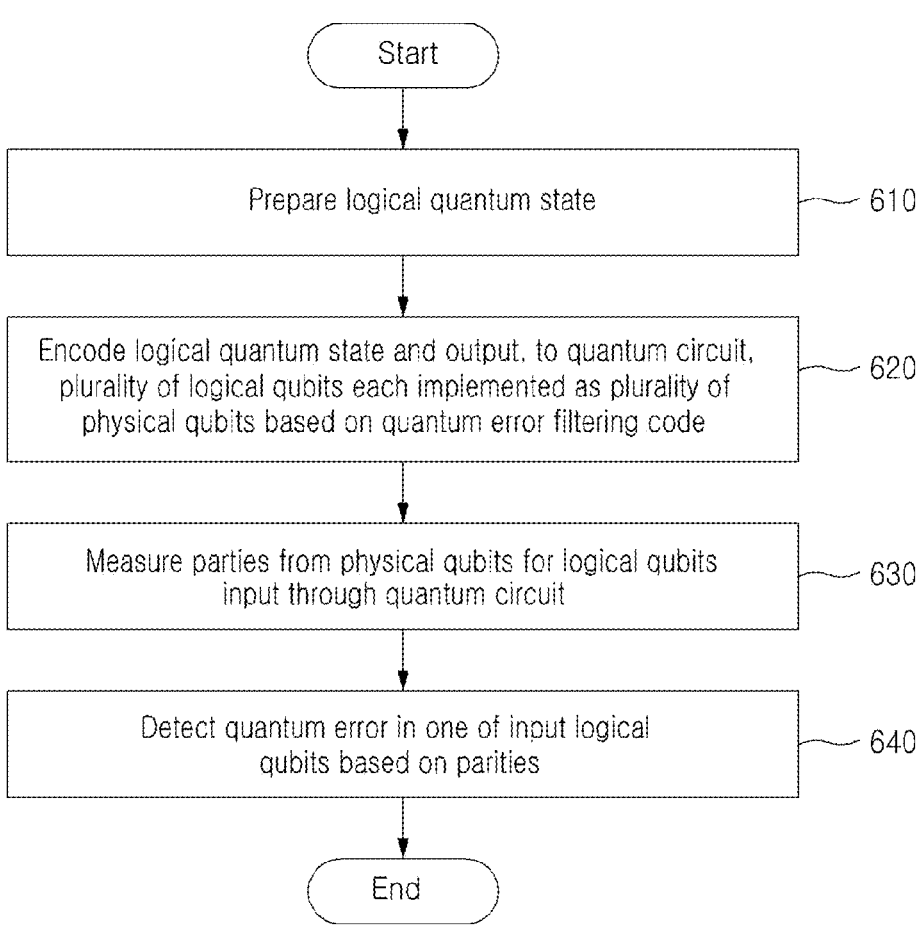

Start

Prepare logical quantum state — 610

Encode logical quantum state and output, to quantum circuit, plurality of logical qubits each implemented as plurality of physical qubits based on quantum error filtering code — 620

Measure parties from physical qubits for logical qubits input through quantum circuit — 630

Detect quantum error in one of input logical qubits based on parities — 640

End

METHOD AND DEVICE FOR QUANTUM ERROR FILTERING USING QUANTUM ERROR FILTERING CODE

CROSS-REFERENCE TO RELATED APPLICATION(S)

This application is a U.S. national stage application of PCT/KR2024/000620 filed on Jan. 12, 2024, which claims the priority benefit of Korean Patent Application No. 10-2023-0099529, filed on Jul. 31, 2023, in the Korean Intellectual Property Office, the contents of which are all incorporated herein by reference in their entireties.

BACKGROUND

1. Field of the Invention

Example embodiments relate to a method and device for quantum error filtering using a quantum error filtering code.

2. Description of the Related Art

In general, a quantum computer performs calculations using quantum mechanical physical phenomena. The quantum computer using quantum information communication is capable of simultaneously processing a plurality of calculations using a single processing device and is exponentially superior to conventional computers in terms of information processing quantity and speed in processing a specific problem. However, when designing a quantum circuit using quantum hardware (HW) to implement the quantum computer, a quantum error may occur in the quantum circuit due to noise present in the quantum hardware. Therefore, there is conventional technology for detecting and correcting a quantum error from output of the quantum circuit using a quantum error correction code (QECC). However, this technology simply corrects only output of the quantum circuit while maintaining the quantum circuit itself and thus, is inefficient.

SUMMARY

Example embodiments provide a method and device for quantum error filtering using a quantum error filtering code.

According to an aspect, there is provided a quantum error filtering device, and the quantum error filtering device may include an encoder configured to output, to a quantum circuit, a plurality of logical qubits each implemented as a plurality of physical qubits based on a predefined quantum error filtering code; and a filter configured to detect a quantum error in one of the input logical qubits based on parities measured from the physical qubits for the logical qubits input through the quantum circuit.

According to an aspect, there is provide a quantum error filtering method of a computer device, and the quantum error filtering method may include outputting, to a quantum circuit, a plurality of logical qubits each implemented as a plurality of physical qubits based on a predefined quantum error filtering code; and detecting a quantum error in one of the input logical qubits based on parities measured from the physical qubits for the logical qubits input through the quantum circuit.

According to an aspect, there is provided a non-transitory computer-readable recording medium storing instructions that, when executed by a processor, cause the processor to perform a quantum error filtering method on a computer device, the quantum error filtering method including outputting, to a quantum circuit, a plurality of logical qubits each implemented as a plurality of physical qubits based on a predefined quantum error filtering code; and detecting a quantum error in one of the input logical qubits based on parities measured from the physical qubits for the logical qubits input through the quantum circuit.

According to some example embodiments, it is possible to more efficiently detect a quantum error on a quantum circuit using a quantum error filtering code. Through this, to implement a quantum computer, it is possible to remove the quantum circuit with the quantum error and to design the quantum circuit without the quantum error. This allows results without the quantum error to be collected from the quantum computer and may amplify accuracy of calculation results by quantum computing. This technology may also be applicable to cloud quantum computing.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 6 is a flowchart illustrating a quantum error filtering method according to various example embodiments.

DETAILED DESCRIPTION

Hereinafter, example embodiments will be described with reference to the accompanying drawings.

Figure 1:
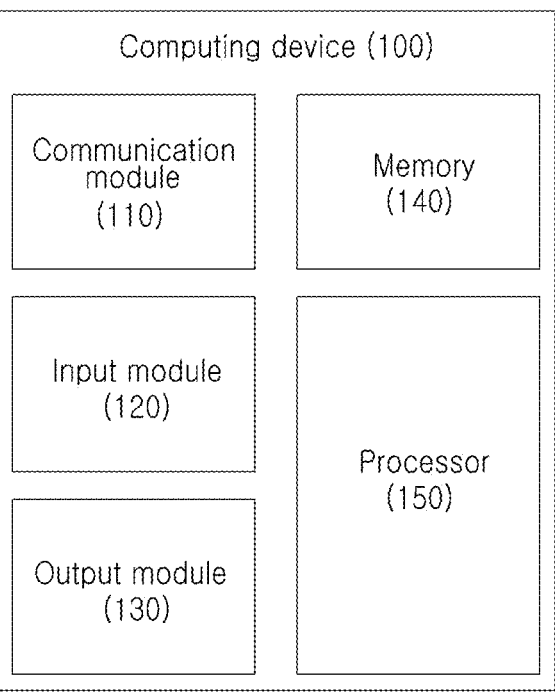
FIG. 1 is a diagram illustrating a configuration of a computer device according to various example embodiments.

FIG. 1 is a diagram illustrating an example of a computer device 100 according to at least one example embodiment.

Referring to FIG. 1, the computer device 100 may include at least one of a communication module 110, an input module 120, an output module 130, a memory 140, and a processor 150. In some example embodiments, at least one of components of the computer device 110 may be omitted and at least one another component may be added. In some example embodiments, at least two components among the components of the computer device 110 may be integrated into a single component.

The communication module 110 may communicate with an external device in the computer device 100. The communication module 110 may establish a communication channel between the computer device 100 and the external device and may perform communication with the external device through the communication channel. Here, the external device may include at least one of another computer device, a base station, and a server. The communication module 110 may include at least one of a wired communication module and a wireless communication module. The wired communication module may be connected to the external device in a wired manner and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, wireless fidelity (WiFi) direct, and infrared data association (IrDA). The far field communication module may communicate with the external device using a far field communication scheme. Here, the far field communication module may communicate with the external device over a network. For example, the network may include at least one of a cellular network, the Internet, and a computer network, such as a local area network (LAN) and a wide area network (WAN).

The input module 120 may input a signal to be used for at least one component of the computer device 100. The input module 120 may be configured to detect a signal directly input from a user or to generate a signal by detecting a change in surroundings. For example, the input module 120 may include at least one of a mouse, a keypad, a microphone, and a sensing module having at least one sensor. In some example embodiments, the input module 120 may include at least one of a touch circuitry set to detect a touch and a sensor circuitry set to measure intensity of force generated by the touch.

The output module 130 may output information to the outside of the computer device 100. The output module 130 may include at least one of a display module configured to visually output information and an audio output module configured to output information as an audio signal. For example, the audio output module may include at least one of a speaker and a receiver.

The memory 140 may store a variety of data used by at least one component of the computer device 100. For example, the memory 140 may include at least one of a volatile memory and a non-volatile memory. Data may include at least one program and input data or output data related thereto. The program may be stored in the memory 140 as software including at least one instruction and may include at least one of an operating system (OS), middleware, and an application.

The processor 150 may control at least one component of the computer device 100 by executing the program of the memory 140. Through this, the processor 150 may perform data processing or operation. Here, the processor 150 may execute an instruction stored in the memory 140. The processor 150 may be provided to perform a quantum error filtering method. In detail, the processor 150 may detect a quantum error generated on a quantum circuit using a predefined quantum error filtering code (QEFC) and, through this, may remove the quantum circuit with the quantum error. Here, the quantum error may include at least one of a bit error (which may also be referred to as an X error) and a phase error (which may also be referred to as a Z error). To this end, the processor 150 may include a quantum error filtering device.

The quantum error filtering code may include a 2-qubit quantum error filtering code and a 4-qubit quantum error filtering code. The 2-qubit quantum error filtering code may be used to detect one of the bit error and the phase error. According to a first example embodiment, the 2-qubit quantum error filtering code may be used to detect the bit error and may be defined as two logical qubits as shown in [Equation 1] below. According to a second example embodiment, the 2-qubit quantum error filtering code may be used to detect the phase error and may be defined as two logical qubits as shown in [Equation 2] below. The 4-qubit quantum error filtering code may be used to detect the bit error and the phase error together. According to a third example embodiment, the 4-qubit quantum error filtering code may be defined as two logical qubits as shown in [Equation 3] below.

$$|0\rangle_L = |00\rangle, |1\rangle_L = |11\rangle \qquad \text{[Equation 1]}$$

$$|0\rangle_L = |++\rangle, |1\rangle_L = |--\rangle, |\pm\rangle = \frac{|0\rangle \pm |1\rangle}{\sqrt{2}} \qquad \text{[Equation 2]}$$

$$|0\rangle_L = \frac{1}{2}(|00\rangle + |11\rangle)(|00\rangle + |11\rangle), \qquad \text{[Equation 3]}$$

$$|1\rangle_L = \frac{1}{2}(|00\rangle - |11\rangle)(|00\rangle - |11\rangle)$$

Here, $|0\rangle_L$ represents logical qubit of 0 qubit, $|1\rangle_L$ represents logical qubit of 1 qubit, 0 and 1 represent bits, and + and − represent phases.

Figure 2:
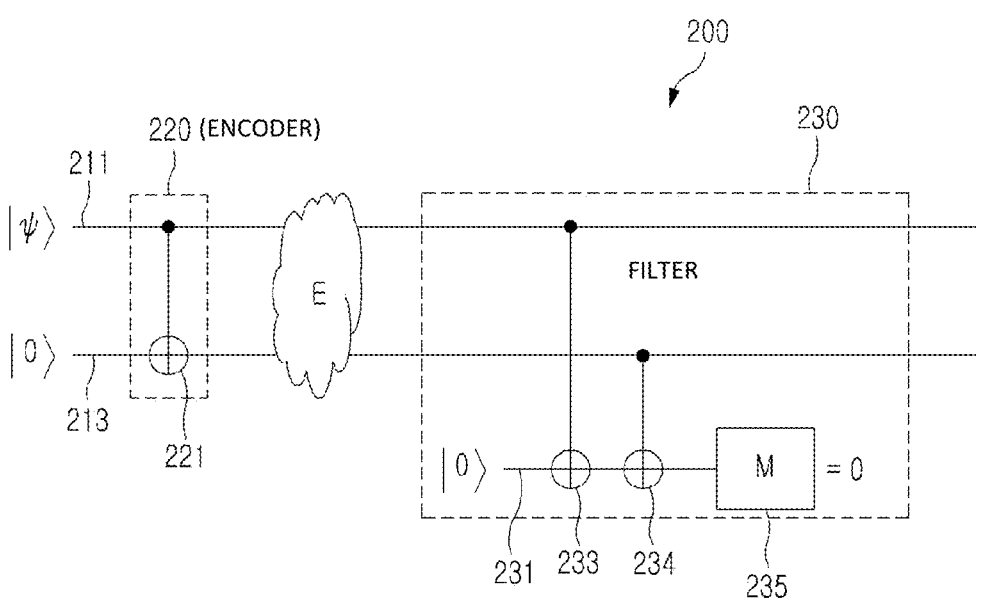
FIG. 2 illustrates a quantum error filtering device according to a first example embodiment.

FIG. 2 illustrates a quantum error filtering device 200 according to the first example embodiment.

Referring to FIG. 2, the quantum error filtering device 200 of the first example embodiment is provided to detect a bit error and may be provided on a quantum circuit that includes two qubit lines 211 and 213. Here, the quantum error filtering device 200 may detect a bit error for the qubit lines 211 and 213. The quantum error filtering device 200 may include an encoder 220 and a filter 230. Here, a quantum state ($|\Psi\rangle$) that includes 0 qubit and 1 qubit may be prepared.

The encoder 220 may encode the input quantum state and may output, to the quantum circuit, two logical qubits based on a 2-qubit quantum error filtering code. Here, each of the logical qubits may be implemented as two physical qubits of the same states as shown in the above [Equation 1]. Here, the states represent bits, logical qubit of 0 qubit may be implemented as physical qubits corresponding to 0 and logical qubit of 1 qubit may be implemented as physical qubits corresponding to 1. To this end, the encoder 220 may include a single CNOT gate 221 and the CNOT gate 221 may be applied to one of the qubit lines 211 and 213.

Here, a quantum error (E) may occur on the quantum circuit. That is, the quantum error (E), that is, a bit error may occur between the encoder 220 and the filter 230. In this case, physical qubits for one of logical qubits output from the encoder 220 may change from the same states to different states. For example, one of the physical qubits may change from 0 to 1 or may change from 1 to 0.

The filter 230 may determine an occurrence status of the quantum error (E) on the quantum circuit based on parities measured for the logical qubits input through the quantum circuit. In detail, the filter 230 may measure a parity from physical qubits for each of the input logical qubits and, through this, may measure parities of the input logical qubits. Here, if the physical qubits are the same states, the parity may be 0, and if the physical qubits are different states, the parity may be 1. Therefore, the filter 230 may determine the occurrence status of the quantum error (E) on the quantum circuit from the sum of parities. To this end, the filter 230 includes an additional qubit line 231, two CNOT gates 233 and 234 applied to the additional qubit line 231, and a measurement unit 235, and the measurement unit 235 may substantially acquire the sum of parities. If the sum of parities is 0, the filter 230 may determine that the quantum error (E) is absent in the input logical qubits and may determine that the quantum error (E) has not occurred on the quantum circuit. In this case, the quantum circuit may not be removed. If the sum of parities is 1, the filter 230 may determine that the quantum error (E) is present in one of the input logical qubits and may determine that the quantum error (E) has occurred on the quantum circuit. In this case, the quantum circuit may be removed.

Figure 3:
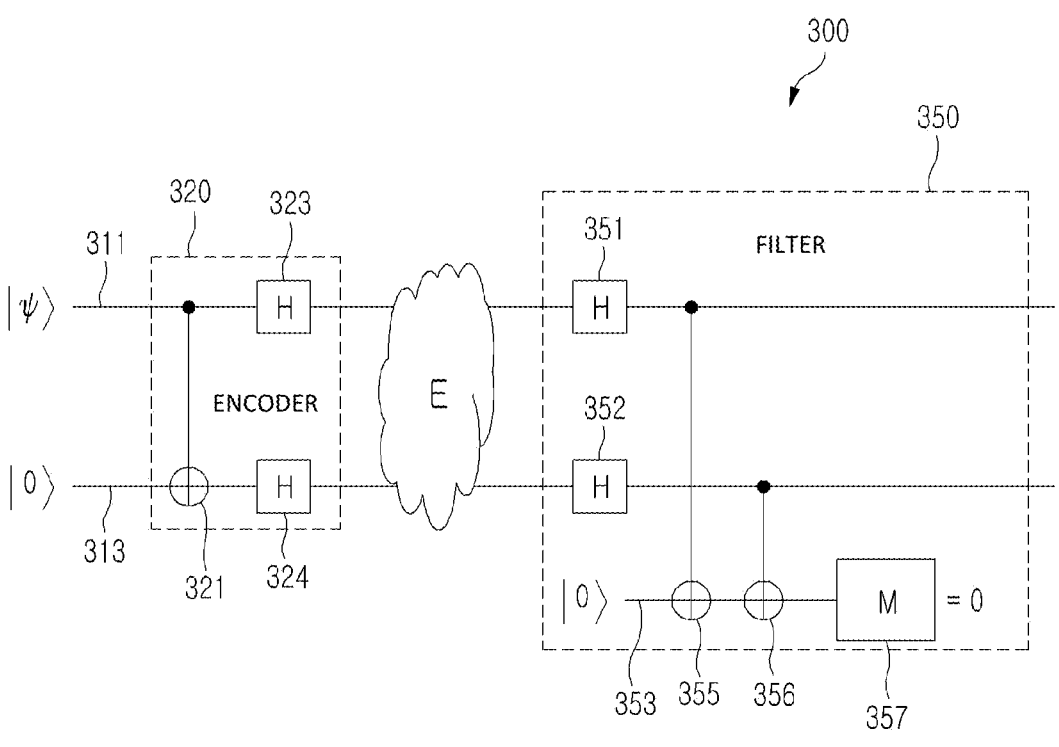
FIG. 3 illustrates a quantum error filtering device according to a second example embodiment.

FIG. 3 illustrates a quantum error filtering device 300 according to the second example embodiment.

Referring to FIG. 3, the quantum error filtering device 300 of the second example embodiment may be provided to detect a phase error and may be provided on a quantum circuit that includes two qubit lines 311 and 313. Here, the quantum error filtering device 300 may detect a phase error for the qubit lines 311 and 313. The quantum error filtering device 300 may include an encoder 320 and a filter 350. Here, a quantum state (that includes 0 qubit and 1 qubit may be prepared.

The encoder 320 may encode the input quantum state and may output, to the quantum circuit, two logical qubits based on a 2-qubit quantum error filtering code. Here, each of the logical qubits may be implemented as two physical qubits of the same states as shown in the above [Equation 2]. Here, the states represent phases, logical qubit of 0 qubit may be implemented as physical qubits corresponding to + (positive) and logical qubit of 1 qubit may be implemented as physical qubits corresponding to − (negative). To this end, the encoder 320 may include a single CNOT gate 321 and two Hadamard (H) gates 323 and 324. Here, the CNOT gate 321 may be applied to one of the qubit lines 311 and 313, and the H gates 323 and 324 may be applied to the qubit lines 311 and 313, respectively, behind the CNOT gate 321.

Here, a quantum error (E) may occur on the quantum circuit. That is, the quantum error (E), that is, a phase error may occur between the encoder 320 and the filter 350. In this case, physical qubits for one of logical qubits output from the encoder 320 may change from the same states to different states. For example, one of the physical qubits may change from + to − or may change from − to +.

The filter 350 may determine an occurrence status of the quantum error (E) on the quantum circuit based on parities measured for the logical qubits input through the quantum circuit. In detail, the filter 350 may measure a parity from physical qubits for each of the input logical qubits and, through this, may measure parities of the input logical qubits. Here, if the physical qubits are the same states, the parity may be 0, and if the physical qubits are different states, the parity may be 1. Therefore, the filter 350 may determine the occurrence status of the quantum error (E) on the quantum circuit from the sum of parities. To this end, the filter 350 may include two H gates 351 and 352, an additional qubit line 353, two CNOT gates 355 and 356 applied to the additional qubit line 353 behind the H gates 351 and 352, and a measurement unit 357, and the measurement unit 357 may substantially acquire the sum of parities. If the sum of parities is 0, the filter 350 may determine that the quantum error (E) is absent in the input logical qubits and may determine that the quantum error (E) has not occurred on the quantum circuit. In this case, the quantum circuit may not be removed. If the sum of parities is 1, the filter 350 may determine that the quantum error (E) is present in one of the input logical qubits and may determine that the quantum error (E) has occurred on the quantum circuit. In this case, the quantum circuit may be removed.

Figure 4:
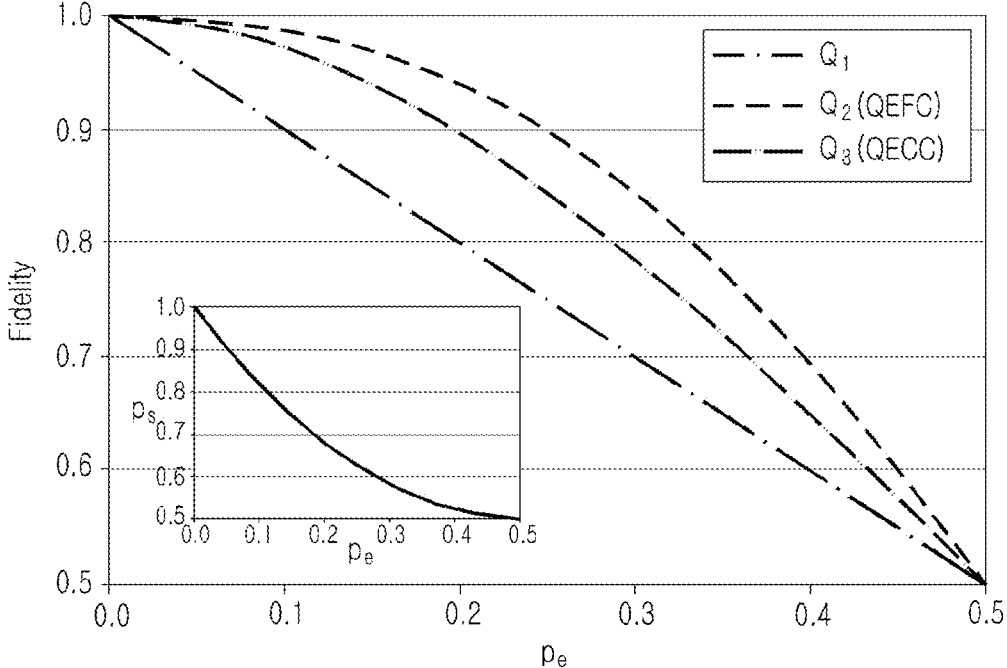
FIG. 4 is a graph showing performance of the quantum error filtering devices according to the first example embodiment and the second example embodiment.

FIG. 4 is a graph showing performance of the quantum error filtering devices 200 and 300 according to the first example embodiment and the second example embodiment.

Referring to FIG. 4, performance for a quantum circuit with noise is compared in a case $(Q_1)$ in which a quantum error filtering code is not used, in a case $(Q_2)$ in which the 2-qubit quantum error filtering code of the first example embodiment is used, and in a case $(Q_3)$ in which the existing quantum error correction code is used. Here, noise in the quantum circuit is product of a single qubit line and a quantum error and is modeled as follows: $E(\rho)=(1-p_e)\rho+p_eX\rho X$. Here, $p_e$ represents an error rate and X represents a Pauli-X (X)) gate. Here, the performance is determined by fidelity according to the error rate. As a result of comparison, the performance in the case $(Q_2)$ in which the 2-qubit quantum error filtering code of the first example embodiment is used is superior to the performance in the case $(Q_3)$ in which the existing quantum error correction code is used. By using the 2-qubit quantum error filtering code of the first example embodiment, the quantum error is successfully filtered with a probability of $p_s$. Similarly, the performance in a case in which the 2-qubit quantum error filtering code of the second example embodiment is used may be predicted. Here, noise in the quantum circuit may be modeled as follows: $E(\rho)=(1-p_e)\rho+p_eX\rho X$. Here, Z may represent a Pauli-Z (Z) gate.

Figure 5:
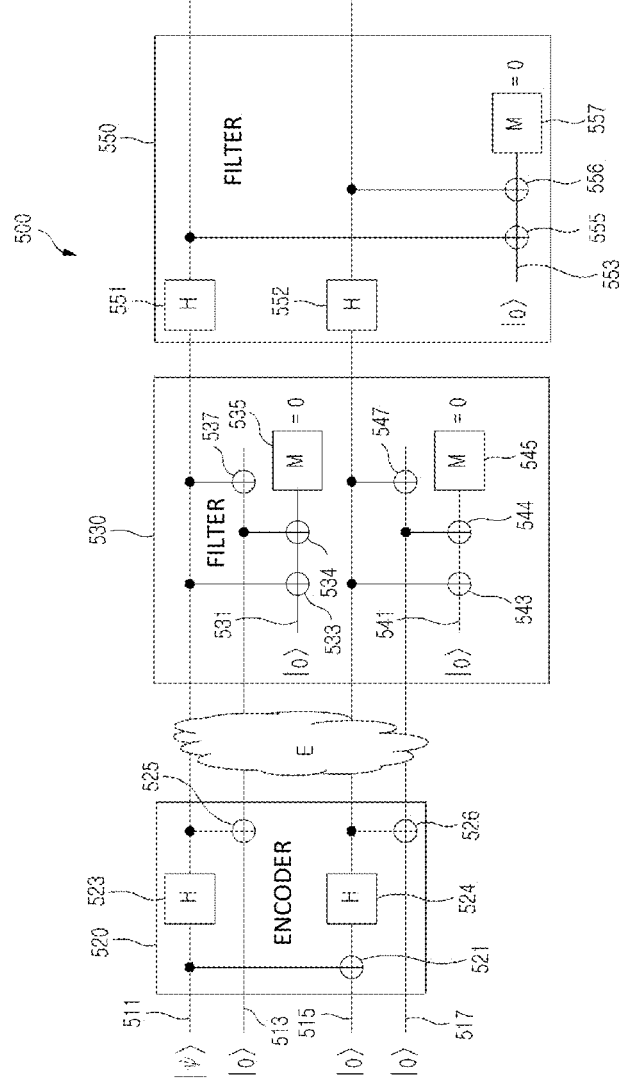
FIG. 5 illustrates a quantum error filtering device according to a third example embodiment.

FIG. 5 illustrates a quantum error filtering device 500 according to the third example embodiment.

Referring to FIG. 5, the quantum error filtering device 500 of the third example embodiment may be provided to detect a bit error and a phase error and may be provided on a quantum circuit that includes four qubit lines 511, 513, 515, and 517. Here, the qubit lines 511, 513, 515, and 517 may include the first qubit line 511, the second qubit line 513, the third qubit line 515, and the fourth qubit line 517. Here, the quantum error filtering device 500 may detect the bit error and the phase error for the qubit lines 511, 513, 515, and 517. The quantum error filtering device 500 may include an encoder 520 and filters 530 and 550. Here, a quantum state $(|\Psi>)$ that includes 0 qubit and 1 qubit may be prepared.

The encoder 520 may encode the input quantum state and may output, to the quantum circuit, two logical qubits based on a 4-qubit quantum error filtering code. Here, each of the logical qubits may be implemented as a combination of a plurality of pairs each including two physical qubits of the same states as shown in the above [Equation 3]. Here, states of physical qubits of each of the pairs represent either bits or phases and, through this, the combination may represent a combination of bits and phases. That is, logical qubit of 0 qubit may be implemented as a pair of physical qubits corresponding to 0, a pair of physical qubits corresponding to 1, and a pair of physical qubits corresponding to +, and logical quits of 1 qubit may be implemented as a pair of physical qubits corresponding to 0, a pair of physical qubits corresponding to 1, and a pair of physical qubits corresponding to −. To this end, the encoder 520 may include a single CNOT gate 521 located at the front, two H gates 523 and 524, and two CNOT gates 525 and 526 located at the rear. Here, the CNOT gate 521 at the front may be applied to one of the first qubit line 511 and the third qubit line 515, the H gates 523 and 524 may be applied to the first qubit line 511 and the third qubit line 515, respectively, behind the located at the front CNOT gate 521, and the CNOT gates 525 and 526 located at the rear may be applied to the second qubit line 513 and the fourth qubit line 517, respectively, behind the H gates 523 and 524.

Here, a quantum error (E) may occur on the quantum circuit. That is, the quantum error (E), that is, at least one of a bit error and the phase error may occur between the encoder 520 and the filters 530 and 550. In this case, physical qubits for one of the logical qubits output from the encoder 520 may change from the same states to different states. For example, one of the physical qubits may change from 0 to 1 or may change from 1 to 0, or one of the physical qubits may change from + to − or may change from − to +.

The filters 530 and 550 may determine an occurrence status of the quantum error (E) based on parities measured for logical qubits input through the quantum circuit. The filters 530 and 550 may include the first filter 530 and the second filter 550. The first filter 530 may determine an occurrence status of a bit error for each of the logical qubits input through the quantum circuit. To this end, the first filter 530 may be divided into a first filtering unit and a second filtering unit. The second filter 550 may determine an occurrence status of a phase error for each of the logical qubits input through the quantum circuit.

In the first filter 530, the first filtering unit may correspond to the first qubit line 511 and the second qubit line 513 and may determine the occurrence status of the bit error for one of the input logical qubits, that is, a first logical qubit. In detail, the first filtering unit may measure a parity from physical qubits for each of pairs that represent bits in the first logical qubit, and, through this, may measure each of parities of corresponding pairs from the first logical qubit. Here, in each of the corresponding pairs, if the physical qubits are the same states, the parity may be 0, and if the physical qubits are different states, the parity may be 1. Therefore, the first filtering unit may determine the occurrence status of the bit error for the first logical qubit from the sum of parities. To this end, the first filtering unit may include an additional qubit line 531, and two CNOT gates 533 and 534 applied to the additional qubit line 531, and a measurement unit 535, and the measurement unit 535 may substantially acquire the sum of parities. Additionally, the first filtering unit may further include an additional CNOT gate 537 applied to the second qubit line 513 behind the CNOT gates 533 and 534. If the sum of parities is 0, the first filtering unit may determine that the bit error is absent in the first logical qubit. In this case, the quantum circuit may not be removed. If the sum of parities is 1, the first filtering unit may determine that the bit error is present in the first logical qubit. In this case, the quantum circuit may be removed.

Likewise, in the first filter 530, the second filtering unit may correspond to the third qubit line 515 and the fourth qubit line 517, and may determine the occurrence status of the bit error for another one of the input logical qubits, that is, a second logical qubit. In detail, the second filtering unit may measure a parity from physical qubits for each of pairs that represent bits in the second logical qubit and, through this, may measure each of parities of corresponding pairs in the second logical qubit. Here, in each of the corresponding pairs, if the physical qubits are the same states, the parity may be 0 and if the physical qubits are different states, the parity may be 1. Therefore, the second filtering unit may determine the occurrence status of the bit error for the second logical qubit from the sum of parities. To this end, the second filtering unit may include an additional qubit line 541, and two CNOT gates 543 and 544 applied to the additional qubit line 541, and a measurement unit 545, and the measurement unit 545 may substantially acquire the sum of parities. Additionally, the second filtering unit may further include an additional CNOT gate 547 applied to the fourth qubit line 517 behind the CNOT gates 543 and 544. If the sum of parities is 0, the second filtering unit may determine that the bit error is absent in the second logical qubit. In this case, the quantum circuit may not be removed. If the sum of parities is 1, the second filtering unit may determine that the bit error is present in the second logical qubit. In this case, the quantum circuit may be removed.

The second filter 550 may correspond to the first qubit line 511 and the third qubit line 515 and may measure a parity from physical qubits that represent phases for each of the input logical qubits and, through this, may measure each of parities of the input logical qubits. Here, if the physical qubits are the same states, the parity may be 0 and if the physical qubits are different states, the parity may be 1. Therefore, the second filter 550 may determine the occurrence status of the phase error on the quantum circuit from the sum of parities. To this end, the second filter 550 may include two H gates 551 and 552, an additional qubit line 553, two CNOT gates 555 and 556 applied to the additional qubit line 553 behind the H gates 551 and 552, and a measurement unit 557, and the measurement unit 557 may substantially acquire the sum of parities. If the sum of parities is 0, the second filter 550 may determine that the phase error is absent in the input logical qubits and may determine that the phase error has not occurred on the quantum circuit. In this case, the quantum circuit may not be removed. If the sum of parities is 1, the second filter 550 may determine that the phase error is present in one of the input logical qubits and may determine that the phase error has occurred on the quantum circuit. In this case, the quantum circuit may be removed.

As described above, when the first filter 530 determines that the bit error is present in one of the input logical qubits, the quantum circuit may be removed without a need for the second filter 550 to determine whether the phase error is present in the input logical qubits. Here, Y error is product of the bit error (i.e., X error) and the phase error (i.e., Z error). Therefore, when Y error is present in the quantum circuit, the quantum circuit may be removed by the first filter 530. Meanwhile, when the first filter 530 determines that the bit error is absent for the input logical qubits, the second filter 550 may determine that the phase error is present for the input logical qubits. When the second filter 550 determines that the phase error is present in one of the input logical qubits, the quantum circuit may be removed. Through this, when all of the first filter 530 and the second filter 550 determine that the quantum error (E) is absent in the input logical qubits, the quantum circuit may not be removed.

FIG. 6 is a flowchart illustrating a quantum error filtering method of the computer device 100 according to various example embodiments.

Referring to FIG. 6, in operation 610, the computer device 100 may prepare a quantum state. The processor 150 may prepare the quantum state that includes 0 qubit and 1 qubit. The processor 150 may include the quantum error filtering device 200, 300, 500, and the quantum error filtering device 200, 300, 500 may include the encoder 220, 320, 520 and the filter 230, 350, 530, 550.

In operation 620, the computer device 100 may output, to a quantum circuit, a plurality of logical qubits each implemented as a plurality of physical qubits based on a quantum error filtering code. The quantum error filtering code may include a 2-qubit quantum error filtering code and a 4-qubit quantum error filtering code. According to the first example embodiment, the 2-qubit quantum error filtering code may be defined as two logical qubits as shown in the above [Equation 1]. Therefore, the encoder 220 of the quantum error filtering device 200 may output, to the quantum circuit, two logical qubits based on the 2-qubit quantum error filtering code and each of the logical qubits may be implemented as two physical qubits of the same bits. According to the second example embodiment, the 2-qubit quantum error filtering code may be defined as two logical qubits as shown in the above [Equation 2]. Therefore, the encoder 320 of the quantum error filtering device 300 may output, to the quantum circuit, two logical qubits based on the 2-qubit quantum error filtering code and each of the logical qubits may be implemented as two physical qubits of the same phases. According to the third example embodiment, the 4-qubit quantum error filtering code may be defined as two logical qubits as shown in the above [Equation 3]. Therefore, the encoder 520 of the quantum error filtering device 500 may output, to the quantum circuit, two logical qubits based on the 4-qubit quantum error filtering code and each of the logical qubits may be implemented as a combination of a plurality of pairs each including two physical qubits of the same states.

Here, a quantum error (E) may occur on the quantum circuit. That is, the quantum error (E), that is, at least one of a bit error and a phase error may occur between the encoder 220, 320, 520 and the filter 230, 350, 530, 550. In this case, physical qubits for one of the logical qubits output from the encoder 220, 320, 520 may change from the same states to different states. For example, one of the physical qubits may change from 0 to 1 or may change from 1 to 0, or one of the physical qubits may change from + to − or may change from − to +.

In operation 630, the computer device 100 may measure parities for logical qubits input through the quantum circuit. According to the first example embodiment, the filter 230 may measure a parity from physical qubits for each of the input logical qubits and, through this, may measure each of parities of the input logical qubits. Here, if the physical qubits are the same states, the parity may be 0, and if the physical qubits are different states, the parity may be 1. According to the second example embodiment, the filter 350 may measure a parity from physical qubits for each of the input logical qubits and, through this, may measure each of parities of the input logical qubits. Here, if the physical qubits are the same states, the parity may be 0, and if the physical qubits are different states, the parity may be 1. According to the third example embodiment, the first filter 530 may measure a parity from physical qubits for each of pairs representing bits in each of the input logical qubits and, through this, may measure each of parities of the corresponding pairs in each of the logical qubits. Meanwhile, according to the third example embodiment, the second filter 550 may measure a parity from physical qubits representing phases for each of the input logical qubits and may measure each of parities of the input logical qubits.

In operation 640, the computer device 100 may detect the quantum error (E) in one of the input logical qubits based on the parities. According to the first example embodiment, the filter 230 may determine an occurrence status of a bit error on the quantum circuit from the sum of parities. If the sum of parities is 0, the filter 230 may determine that the bit error is absent in the input logical qubits and may determine that the quantum error (E) has not occurred on the quantum circuit. If the sum of parities is 1, the filter 230 may determine that the quantum error (E) is present in one of the input logical qubits and may determine that the quantum error (E) has occurred on the quantum circuit. According to the second example embodiment, the filter 350 may determine an occurrence status of the quantum error (E) on the quantum circuit from the sum of parities. If the sum of parities is 0, the filter 350 may determine that the quantum error (E) is absent in the input logical qubits and may determine that the quantum error (E) has not occurred on the quantum circuit. If the sum of parities is 1, the filter 350 may determine that the quantum error (E) is present in one of the input logical qubits and may determine that the quantum error (E) has occurred on the quantum circuit. According to the third example embodiment, the first filter 530 may determine an occurrence status of a bit error on the quantum circuit from the sum of parities. Meanwhile, according to the third example embodiment, the second filter 550 may determine an occurrence status of a phase error on the quantum circuit from the sum of parities.

When the filter 230, 530 determines that the bit error is present in one of the input logical qubits, the quantum circuit may be removed. Here, Y error is product of the bit error (i.e., X error) and the phase error (i.e., Z error) and thus, when the Y error is present in the quantum circuit, the quantum circuit may be removed by the filter 230, 530. Meanwhile, when the filter 350, 550 determines that the phase error is present in one of the input logical qubits, the quantum circuit may be removed. According to the first example embodiment, when the filter 230 determines that the bit error is absent in the input logical qubits, the quantum circuit may not be removed. According to the second example embodiment, when the filter 350 determines that the phase error is absent in the input logical qubits, the quantum circuit may not be removed. According to the third example embodiment, that all of the first filter 530 and the second filter 550 determine that the quantum error (E) is absent in the input logical qubits, the quantum circuit may not be removed.

According to the present disclosure, a quantum error may be more efficiently detected on a quantum circuit using a quantum error filtering code. Through this, to implement a quantum computer, a quantum circuit with a quantum error may be removed and the quantum circuit without the quantum error may be designed. Since this allows only results without the quantum error to be collected from the quantum computer, accuracy of calculation results by quantum computing may be amplified. This technology may also be applied to cloud quantum computing.

The present disclosure provides a method and device for quantum error filtering using a quantum error filtering code.

The quantum error filtering device 200, 300, 500 of the present disclosure may include the encoder 220, 320, 520 configured to output, to a quantum circuit, a plurality of logical qubits each implemented as a plurality of physical qubits based on a predefined quantum error filtering code; and the filter 230, 350, 530, 550 configured to detect a quantum error (E) in one of the input logical qubits based on parities measured from the physical qubits for the logical qubits input through the quantum circuit.

According to some example embodiments, the quantum error filtering code may include a 2-qubit quantum error filtering code, and the encoder 220, 320 may be configured to output two logical qubits each implemented as two physical qubits of the same states based on the 2-qubit quantum error filtering code.

According to some example embodiments, when the quantum error (E) occurs between the encoder 220, 320 and the filter 230, 350, the physical qubits for one of the output logical qubits may change from the same states to different states.

According to some example embodiments, the states may represent either bits or phases, and the quantum error (E) may be either a bit error as the physical qubits change from the same bits to different bits or a phase error as the physical qubits change from the same phases to different phases.

According to some example embodiments, the filter 230, 350 may be configured to determine that the quantum error (E) is absent in the input logical qubits if the sum of parities for the input logical qubits is 0, and to determine that the quantum error (E) is present in one of the input logical qubits if the sum of parities for the input logical qubits is 1.

According to the first example embodiment, the 2-qubit quantum error filtering code may be defined as two logical qubits as shown in the above [Equation 1].

According to the second example embodiment, the 2-qubit quantum error filtering code may be defined as two logical qubits as shown in the above [Equation 2].

According to another example embodiment, the quantum error filtering code may include a 4-qubit quantum error filtering code, and the encoder 520 may be configured to output two logical qubits each implemented as a combination of a plurality of pairs each including two physical qubits of the same states based on the 4-qubit quantum error filtering code.

According to another example embodiments, when an error occurs between the encoder 520 and the filter 530, 550, the physical qubits for one of the pairs in at least one of the output logical qubits may change from the same states to different states.

According to other example embodiments, the states of the physical qubits of each of the pairs may represent either bits or phases, the combination may represent a combination of the bits and the phases, and the quantum error (E) may include a bit error as the physical qubits change from the same states to different states and a phase error as the physical qubits change from the same phases to different phases.

According to other example embodiments, the filters 530 and 550 may include the first filter 530 configured to detect the bit error for each of the input logical qubits; and the second filter 550 configured to detect the phase error for one of the input logical qubits.

According to other example embodiments, the 4-qubit quantum error filtering code may be defined as two logical qubits as shown in the above [Equation 3].

A quantum error filtering method of the computer device 100 of the present disclosure may include operating 620 of outputting, to a quantum circuit, a plurality of logical qubits each implemented as a plurality of physical qubits based on a predefined quantum error filtering code; and operations 630 and 640 of detecting a quantum error (E) in one of the input logical qubits based on parities measured from the physical qubits for the logical qubits input through the quantum circuit.

According to some example embodiments, the quantum error filtering code may include a 2-qubit quantum error filtering code, and operation 620 of outputting to the quantum circuit may include outputting two logical qubits implemented as two physical qubits of the same states based on the 2-qubit quantum error filtering code.

According to some example embodiments, when the quantum error (E) occurs in the quantum circuit, the physical qubits for one of the output logical qubits may change from the same states to different states.

According to some example embodiments, the states may represent either bits or phases, and the quantum error (E) may be either a bit error as the physical qubits change from the same bits to different bits or a phase error as the physical qubits change from the same phases to different phases.

According to some example embodiments, operations 630 and 640 of detecting the quantum error (E) may include determining that the quantum error is absent in the input logical qubits if the sum of parities for the input logical qubits is 0; and determining that the quantum error is present in one of the input logical qubits if the sum of parities for the input logical qubits is 1.

According to another example embodiment, the quantum error filtering code may include a 4-qubit quantum error filtering code, and operation 620 of outputting to the quantum circuit may include outputting two logical qubits each implemented as a combination of a plurality of pairs each including two physical qubits of the same states based on the 4-qubit quantum error filtering code.

According to another example embodiment, when an error occurs between the encoder and the filter, the physical qubits for one of the pairs in at least one of the output logical qubits may change from the same states to different states.

According to another example embodiments, the states of the physical qubits of each of the pairs may represent either bits or phases, the combination may represent a combination of the bits and the phases, and the quantum error (E) may include a bit error as the physical qubits change from the same states to different states and a phase error as the physical qubits change from the same phases to different phases.

According to another example embodiment, operations 630 and 640 of detecting the quantum error (E) may include detecting the bit error for each of the input logical qubits; and detecting the phase error for one of the input logical qubits.

The apparatuses described herein may be implemented using hardware components, software components, and/or combination of the hardware components and the software components. For example, a processing device and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, other processing configurations are possible, such as parallel processors.

The software may include a computer program, a piece of code, an instruction, or at least one combination thereof, for independently or collectively instructing or configuring the processing device to operate as desired. Software and/or data may be embodied in any type of machine, component, physical equipment, computer storage medium or device, to provide instructions or data to the processing device or be interpreted by the processing device. The software also may be distributed over network coupled computer systems so that the software is stored and executed in a distributed fashion. The software and data may be stored by one or more computer readable storage mediums.

The methods according to various example embodiments may be implemented in a form of a program instruction executable through various computer methods and recorded in computer-readable media. Here, the media may be to continuously store a computer-executable program or to temporarily store the same for execution or download. The media may be various types of recording methods or storage methods in which single hardware or a plurality of hardware is combined and may be distributed over a network without being limited to a medium that is directly connected to a computer system. Examples of the media include magnetic media such as hard disks, floppy disks, and magnetic tapes; optical media such as CD ROM and DVD; magneto-optical media such as floptical disks; and hardware devices that are specially configured to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

Various example embodiments and the terms used herein are not construed to limit description disclosed herein to a specific implementation and should be understood to include various modifications, equivalents, and/or substitutions of a corresponding example embodiment. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe corresponding components regardless of order or importance and the terms are simply used to distinguish one component from another component. The components should not be limited by the terms. When a component (e.g., a first component) is described to be "(functionally or communicatively) connected to" or "accessed to" another component (e.g., a second component), the component may be directly connected to the other component or may be connected through still another component (e.g., a third component).

According to various example embodiments, each of the components (e.g., module or program) may include a singular object or a plurality of objects. According to various example embodiments, at least one of the components or operations may be omitted. Alternatively, at least one another component or operation may be added. Alternatively or additionally, a plurality of components (e.g., module or program) may be integrated into a single component. In this case, the integrated component may perform one or more functions of each of the components in the same or similar manner as it is performed by a corresponding component before integration. According to various example embodiments, operations performed by a module, a program, or another component may be performed in a sequential, parallel, iterative, or heuristic manner. Alternatively, at least one of the operations may be performed in different sequence or omitted. Alternatively, at least one another operation may be added.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A quantum error filtering device comprising:

an encoder comprising a first quantum circuit configured to output, to a quantum circuit, a plurality of logical qubits each implemented as a plurality of physical qubits based on a predefined quantum error filtering code; and a filter comprising a second quantum circuit configured to detect a quantum error in one of the input logical qubits based on parities measured from the physical qubits for the logical qubits input through the quantum circuit, wherein the filter is further configured to determine that a computational result from the quantum circuit is to be discarded based on the detected quantum error, wherein the quantum error filtering code includes a 2-qubit quantum error filtering code or a 4-qubit quantum error filtering code, wherein the 2-qubit quantum error filtering code is defined as two logical qubits as shown in the following equation, $$|0>_L = |++>, |1>_L = |-->$$

where $|0>_L$ represents logical qubit of 0 qubit, $|1>_L$ represents logical qubit of 1 qubit, and + and − represent phases, and wherein the 4-qubit quantum error filtering code is defined as two logical qubits as shown in the following equation, $$|0>_L = \frac{1}{2}(|00> + |11>)(|00> + |11>),$$

$$|1>_L = \frac{1}{2}(|00> - |11>)(|00> - |11>)$$

where $|0>_L$ represents logical qubit of 0 qubit, $|1>_L$ represents logical qubit of 1 qubit, 0 and 1 represent bits, and + and − represent phases.

2. The quantum error filtering device of claim 1, wherein the quantum error filtering code includes the 2-qubit quantum error filtering code, and wherein the encoder is configured to output two logical qubits each implemented as two physical qubits of the same states based on the 2-qubit quantum error filtering code.

3. The quantum error filtering device of claim 2, wherein, when the quantum error occurs between the encoder and the filter, the physical qubits for one of the output logical qubits change from the same states to different states.

4. The quantum error filtering device of claim 2,
wherein the states represent either bits or phases, and
wherein the quantum error is either a bit error as the
physical qubits change from the same bits to different
bits or a phase error as the physical qubits change from
the same phases to different phases.

5. The quantum error filtering device of claim 2, wherein
the filter is configured to,
determine that the quantum error is absent in the input
logical qubits if a sum of parities for the input logical
qubits is 0, and
determine that the quantum error is present in one of the
input logical qubits if the sum of parities for the input
logical qubits is 1.

6. The quantum error filtering device of claim 1, wherein
the quantum error filtering code includes the 4-qubit quan-
tum error filtering code, and
wherein the encoder is configured to output two logical
qubits each implemented as a combination of a plural-
ity of pairs each including two physical qubits of the
same states based on the 4-qubit quantum error filtering
code.

7. The quantum error filtering device of claim 6, wherein,
when an error occurs between the encoder and the filter, the
physical qubits for one of the pairs in at least one of the
output logical qubits change from the same states to different
states.

8. The quantum error filtering device of claim 6,
wherein the states of the physical qubits of each of the
pairs represent either bits or phases,
wherein the combination represents a combination of the
bits and the phases,
wherein the quantum error includes a bit error as the
physical qubits change from the same states to different
states and a phase error as the physical qubits change
from the same phases to different phases, and
wherein the filter comprises:
a first filter configured to detect the bit error for each of
the input logical qubits; and
a second filter configured to detect the phase error for one
of the input logical qubits.

9. A quantum error filtering method of a computer device,
the quantum error filtering method comprising:
outputting, to a quantum circuit, a plurality of logical
qubits each implemented as a plurality of physical
qubits based on a predefined quantum error filtering
code;
detecting a quantum error in one of the input logical
qubits based on parities measured from the physical
qubits for the logical qubits input through the quantum
circuit; and
determining that a computational result from the quantum
circuit is to be discarded based on the detected quantum
error,
wherein the quantum error filtering code includes a 2-qu-
bit quantum error filtering code or a 4-qubit quantum
error filtering code,
wherein the 2-qubit quantum error filtering code is
defined as two logical qubits as shown in the following
equation, $$|0>_L = |++>, |1>_L = |-->$$

where $|0>_L$ represents logical qubit of 0 qubit, $|1>_L$
represents logical qubit of 1 qubit, and + and − repre-
sent phases, and
wherein the 4-qubit quantum error filtering code is
defined as two logical qubits as shown in the following
equation, $$|0>_L = \frac{1}{2}(|00> + |11>)(|00> + |11>),$$

$$|1>_L = \frac{1}{2}(|00> - |11>)(|00> - |11>)$$

where $|0>_L$ represents logical qubit of 0 qubit, $|1>_L$
represents logical qubit of 1 qubit, 0 and 1 represent
bits, and + and − represent phases.

10. The quantum error filtering method of claim 9,
wherein the quantum error filtering code includes the 2-qubit
quantum error filtering code, and
wherein the outputting to the quantum circuit comprises
outputting two logical qubits each implemented as two
physical qubits of the same states based on the 2-qubit
quantum error filtering code.

11. The quantum error filtering method of claim 10,
wherein, when the quantum error occurs between an encoder
comprising a first quantum circuit and a filter comprising a
second quantum circuit, the physical qubits for one of the
output logical qubits change from the same states to different
states.

12. The quantum error filtering method of claim 10,
wherein the states represent either bits or phases, and
wherein the quantum error is either a bit error as the
physical qubits change from the same bits to different
bits or a phase error as the physical qubits change from
the same phases to different phases.

13. The quantum error filtering method of claim 10,
wherein the detecting of the quantum error comprises:
determining that the quantum error is absent in the input
logical qubits if a sum of parities for the input logical
qubits is 0; and
determining that the quantum error is present in one of the
input logical qubits if the sum of parities for the input
logical qubits is 1.

14. The quantum error filtering method of claim 9,
wherein the quantum error filtering code includes the 4-qubit
quantum error filtering code, and
wherein the outputting to the quantum circuit comprises
outputting two logical qubits each implemented as a
combination of a plurality of pairs each including two
physical qubits of the same states based on the 4-qubit
quantum error filtering code.

15. The quantum error filtering method of claim 14,
wherein, when an error occurs between an encoder com-
prising a first quantum circuit and a filter comprising a
second quantum circuit, the physical qubits for one of the
pairs in at least one of the output logical qubits change from
the same states to different states.

16. The quantum error filtering method of claim 14,
wherein the states of the physical qubits of each of the pairs
represent either bits or phases,
wherein the combination represents a combination of the
bits and the phases,
wherein the quantum error includes a bit error as the
physical qubits change from the same states to different
states and a phase error as the physical qubits change
from the same phases to different phases, and wherein the detecting of the quantum error comprises:

detecting the bit error for each of the input logical qubits; and detecting the phase error for one of the input logical qubits.

17. A non-transitory computer-readable recording medium storing instructions that, when executed by a processor, cause the processor to perform a quantum error filtering method on a computer device, the quantum error filtering method comprising:

outputting, to a quantum circuit, a plurality of logical qubits each implemented as a plurality of physical qubits based on a predefined quantum error filtering code;

detecting a quantum error in one of the input logical qubits based on parities measured from the physical qubits for the logical qubits input through the quantum circuit; and determining that a computational result from the quantum circuit is to be discarded based on the detected quantum error, wherein the quantum error filtering code includes a 2-qubit quantum error filtering code or a 4-qubit quantum error filtering code, wherein the 2-qubit quantum error filtering code is defined as two logical qubits as shown in the following equation, $$|0>_L = |++>, |1>_L = |-->$$

where $|0>_L$ represents logical qubit of 0 qubit $|1>_L$ represents logical qubit of 1 qubit, and + and − represent phases, and wherein the 4-qubit quantum error filtering code is defined as two logical qubits as shown in the following equation, $$|0>_L = \frac{1}{2}(|00>+|11>)(|00>+|11>),$$

$$|1>_L = \frac{1}{2}(|00>-|11>)(|00>-|11>)$$

where $|0>_L$ represents logical qubit of 0 qubit, $|1>_L$ represents logical qubit of 1 qubit, 0 and 1 represent bits, and + and − represent phases.

\* \* \* \* \*